United States Patent [11] 3,617,649

[72] Inventor John Hartley
2904 N. Paula, Clovis, Calif. 93912

[21] Appl. No. 11,515
[22] Filed Feb. 16, 1970
[45] Patented Nov. 2, 1971
Continuation-in-part of application Ser. No. 615,010, Feb. 9, 1967, now abandoned.

[54] MEANS FOR INTERCONNECTING TWO MONOPHONIC RECORDERS FOR STEREO RECORDING, REPRODUCING AND DUPLICATING
2 Claims, 2 Drawing Figs.

[52] U.S. Cl. .......... 179/100.2 MD, 179/100.2 E
[51] Int. Cl. .......... G11b 5/00, G11b 5/86
[50] Field of Search .......... 179/100.2 E, 100.2 MD

[56] References Cited

UNITED STATES PATENTS

| | | | |
|---|---|---|---|
| 2,468,782 | 5/1949 | Ross et al. | 179/100.2 |
| 2,694,108 | 11/1954 | Taylor | 179/100.2 |
| 2,764,639 | 9/1956 | Holt | 179/100.2 MD |
| 2,777,901 | 1/1957 | Dostert | 179/100.2 MD |
| 2,922,848 | 1/1960 | Miller | 179/100.2 MD |
| 3,072,753 | 1/1963 | Goldberg | 179/100.2 E |
| 3,129,296 | 4/1964 | Claras et al. | 179/100.2 MD |
| 3,295,853 | 1/1967 | Cheng | 179/100.2 E |
| 3,298,006 | 1/1967 | Milenkovic et al. | 179/100.2 E |

*Primary Examiner*—Bernard Konick
*Assistant Examiner*—J. Russell Goudeau
*Attorney*—Graybeal, Cole & Barnard

ABSTRACT: Magnetic recording and reproducing system utilizing two separate and distinct monophonic tape recorders. Each of the monophonic units is provided with a stereo head and jacks so that when the two units are interconnected they have a full range of stereophonic usage including playing and recording of stereophonic tape. The units retain their monophonic capability when disconnected from each other.

JOHN HARTLEY
INVENTOR.
BY Graybeal, Cole & Barnard
ATTORNEYS

INVENTOR.
JOHN HARTLEY

BY Graybeal, Cole & Barnard

ATTORNEYS

MEANS FOR INTERCONNECTING TWO MONOPHONIC RECORDERS FOR STEREO RECORDING, REPRODUCING AND DUPLICATING

CROSS-REFERENCE TO RELATED APPLICATION

This application comprises a continuation-in-part of U.S. Pat. application, Ser. No. 615,010 filed Feb. 9, 1967, for "Recording System," in the name of John Hartley, now abandoned.

BACKGROUND OF HE INVENTION

This invention relates generally to the art of magnetic recording in reproducing devices, and more particularly to a magnetic system in which two separate and individually functional monophonic tape recorders are provided with stereo heads and detachably interconnected so that the two units in effect operate together with full range stereo capability.

As presently known monophonic tape recorders can be converted to play or record stereo tapes by installing a stereo head in the monophonic unit and plugging into the unit an external record-play preamplifier, amplifier and speaker to play or record one channel. Monophonic units can also be used strictly as a single track or single signal recorders. But with the ability to plug in an external preamp and amplifier the monophonic unit does have stereo tape-deck capability.

U.S. Pat. No. 3,037,090 is directed to a system for duplicating magnetic tape records in that it provides a different path of travel for a master tape record and for a blank tape. At a point common to both paths of travel, at which point the duplication process is effected, the master and blank tapes are maintained in contact with each other under a predetermined amount f pressure. U.S. Pat. No. 3,072,753 is directed to a system for recording magnetic-strip record-producing means and for producing multiple duplicate copies on magnetic tapes. U.S. Pat. No. 3,295,853 is concerned with two tape transports mounted permanently in a single case with a single set of monaural electronics and a single drive system common to both transports and many other differences from the instant device will be found upon comparison.

SUMMARY OF THE INVENTION

The invention involves two monophonic units, each of which is provided with a stereophonic head and four jack switches. Only two of the jack switches in each unit are used at any one time. A tie-in cord connects two jacks on one unit with two jacks on the other unit for stereophonic play or record. The two jack switches on each unit and the tie-in cord bring into play both sets of preamplifiers and amplifiers for stereo operation.

It is therefore a prime feature of this invention to provide a unique system for interconnecting and synchronizing two separate and distinct monophonic tape recorder units which will not only play stereo tapes but can also record stereophonically.

It is another feature of this invention to provide a system for interconnecting and synchronizing two separate and distinct monophonic tape records for stereo uses in which each of the monophonic units retains its ability to function strictly as a monophonic unit.

It is another feature of this invention to provide a system for interconnecting two separate and distinct monophonic tape recorders in such a way as to constitute an extremely simple stereophonic tape-copying system both technically and functionally.

It is a further feature of this invention to supply a system for interconnecting and synchronizing two separate and distinct monophonic units for stereo capability in which there are no unused components.

It is also a feature of this invention to furnish a system which provides portable stereophonic playback separation without the use of earphones or external speakers and in which the separate monophonic tape units with their speakers may be placed anywhere for the best stereo effect. Thus, no separate speaker units are required.

A still further feature of this invention is to provide a system which, besides playing both mono- and stereophonic tapes, also records stereo master tapes or records stereophonically directly into a blank tape.

An even further feature of this invention is to provide a system which has both monophonic and stereophonic capabilities without sacrificing economy, ease of operation and inherent advantages which reside either in a single package completely stereophonic tape recorder or a complete monophonic unit.

DESCRIPTION OF PREFERRED EMBODIMENT

Figure 1:
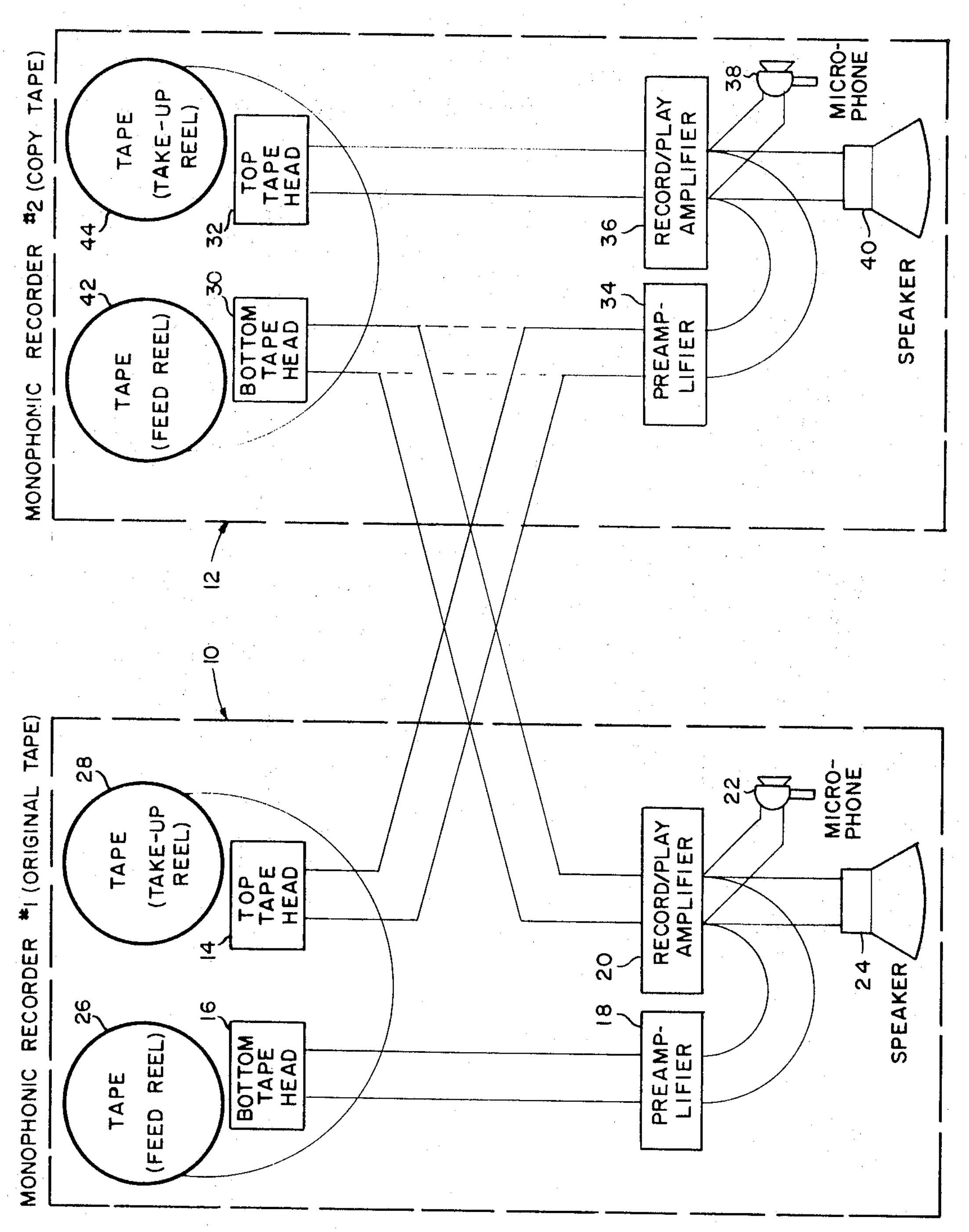
FIG. 1 is a schematic diagram showing generally the manner of interconnecting two monophonic tape recorder units so that a full range of stereophonic usage is attained.

Referring now to FIG. 1 of the drawings, it will be seen that two monophonic tape recorder units 10 and 12 are provided and each of the recorders 10 and 12 is furnished with a stereophonic head. The stereophonic head on recorder 10 has top tape head 14 and bottom track head 16, as well as preamp 18 and amplifier 20, connected as can be seen in the usual manner. In addition, recorder 10 will have microphone 22 and speaker 24. Recorder 10 also has feed reel 26 and takeup reel 28. In like manner, the second monophonic tape recorder 12 has a stereo head with bottom channel head 30, top channel head 32, preamplifier unit 34, amplifier 36, microphone 38, and speaker 40. Monophonic recorder 12 also has feed reel 42 and takeup reel 44.

Figure 2:
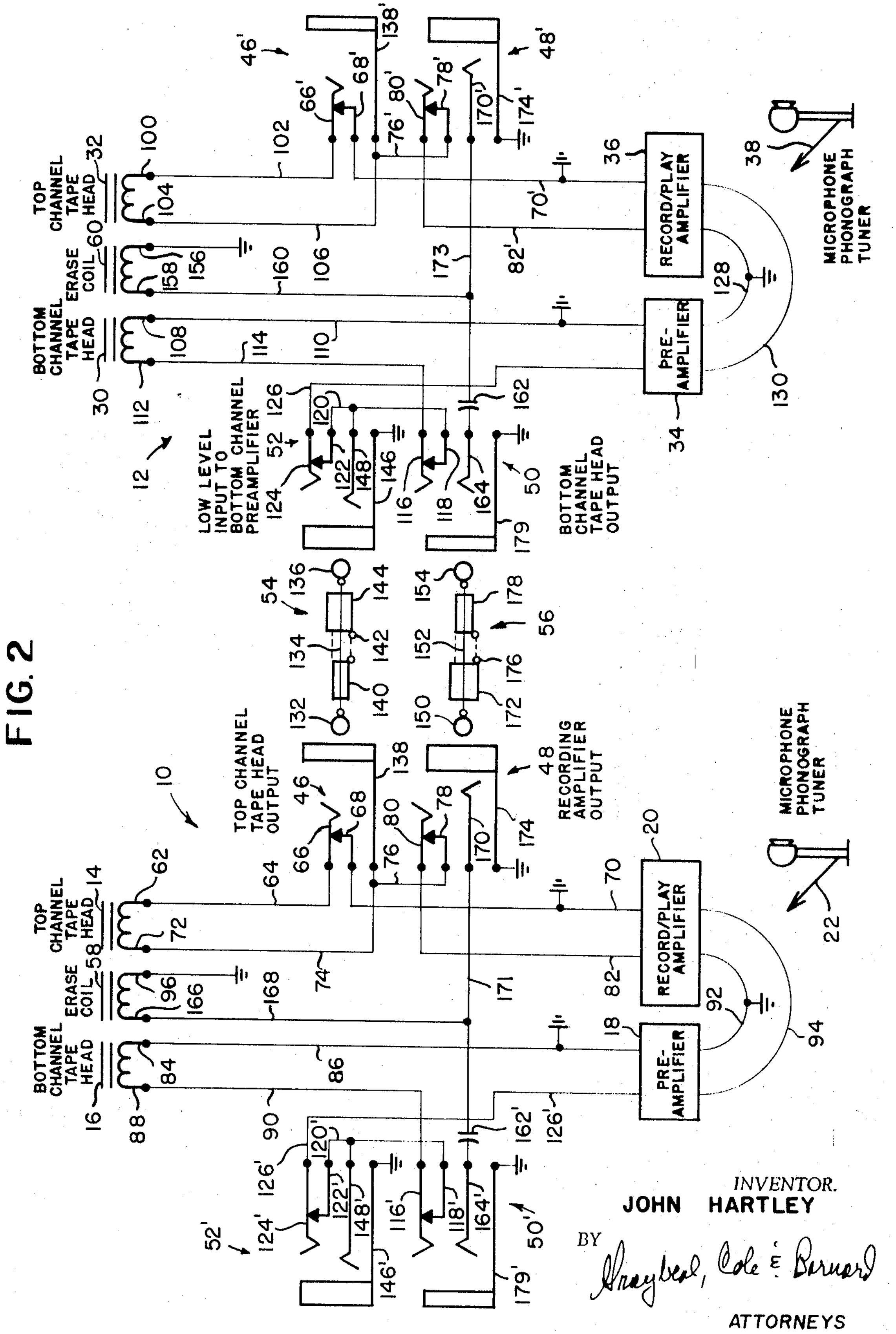
FIG. 2 is an electrical schematic diagram showing the circuitry required in order to produce a full range of stereophonic function and capability from two interconnected monophonic units and including the tie-in cord connector or duplicator attachment.

Referring now to FIG. 2, it will be seen that on recorder 10 a top channel head output is provided by jack 46. A second jack 48 is inserted in recorder 10 as a recording amplifier output for amplifier 20. In recorder 12, 56 is provided to interconnect jack 48 of recorder 10 jack 50 is incorporated as a bottom channel head output or input. Finally in recorder 12 a jack 52 is incorporated as a low-level input to the bottom channel preamplifier 34. The output of the bottom channel preamplifier 34 is wired to the standard recording input of recorder 12 and is disconnected when an outside signal is plugged into the standard recording input. A unique two conductor tie-in cord 54 is provided to interconnect jack 46 of recorder 10 and jack 52 of recorder 12. In like manner, a two conductor tie-in cord 56 is provided to interconnect jack 48 of recorder 10 and jack 50 of recorder 12. Both recorder 10 and recorder 12 are provided with jacks 4, 48, 50, and 52 or a total of four additional jacks and they are in the same respective locations on each recorder, making recorder 10 and recorder 12 identical and thus usable in the same capacity or interchangeable.

When the monophonic recording units 10 and 12 are disengaged or disconnected from each other, their circuitry is conventional. Thus, top channel tape head 14 in recorder 10 is connected to terminal 62, conductor 64, prong 66, prong 68, and conductor 70 to record and play amplifier 20. The circuit from top channel tape head 14 is completed via terminal 72, conductor 74, conductor 76, prong 78, prong 80, and conductor 82 to amplifier 20. The bottom channel tape head 16 is connected through terminal 84 and conductor 86 to preamp 18. The circuit from bottom channel tape head 16 to preamp 18 is completed through terminal 88, conductor 90, prong 116', prong 188', line 120', prong 122', prong 124', and line 126'. The preamp 18 and the amplifier 20 are interconnected by conductors 92 and 94.

In like manner in recorder 12, top channel tape head 32 is connected to terminal 100, conductor 102, prong 66', prong 68', and line 70' to record and play amplifier 36. The circuit from top channel head 32 is completed via terminal 104, line 106, line 76', prong 78', prong 80', and line 82' to amplifier 36. The bottom channel head 30 circuit is completed through terminal 112, line 114, prong 116, prong 118, line 20, prong 122, prong 124, and line 126 to preamplifier 34. The preamp 34 and amplifier 36 are connected by lines 128 and 130.

When the recorders are interconnected with tie-in cords 54 and 56, the copying of stereo tapes for instance is accomplished in the following manner. Blank tape is loaded on recorder 12 and the tape to be copied, or the master, is loaded on recorder 10, and both recorder units are set to a "record" position. The top channel signal is played by top tape head 14 of recorder 10 an relayed through terminal 62, conductor 64, prong 66, tip 132, conductor 134, tip 136, prong 124, conductor 126, equalization circuit or preamp 34, conductor 130, to the microphone input of amplifier 36 where it is prepared as a recording signal, and thence via line 82, prong 80', prong 78', line 76', conductor 106, terminal 104 to top tape head 32 of recorder 12 where the input signal is recorded. Ground return for top tape head 14 of recorder 10 proceeds through terminal 72, conductor 74, prong 138, sleeve 140, shield 142, sleeve 144, and prong 146, which is connected to ground. Ground return for top tape head 32 of recorder 12 is terminal 100, conductor 102, prong 66', prong 68', and line 70 to ground.

The bottom channel signal is played by bottom tape head 16 of recorder 10 and is relayed through terminal 88, conductor 90, prong 116', prong 118', line 120', prong 122', prong 124', and line 126' to equalization circuit or preamp 18 and from the preamp by line 94 to the microphone input or recorder amplifier 20 where the signal is prepared to record. From there the signal is taken by conductor 82, prong 80, tip 150, conductor 152, tip 154, prong 116, conductor 114, to terminal 112 of bottom tape head 30 of recorder 12 where the input signal is recorded. Ground return for bottom tape head 16 is terminal 84 and conductor 86 to ground, shown. Ground return for bottom tape head 30 of recorder 12 is terminal 108 and conductor 110 to ground shown.

Since both tape recorders are in the "record" mode, the bias oscillator of recorder 10 must be grounded to prevent erasure of the "master" tape and to prevent heterodyning. Such grounding is accomplished automatically with the insertion of the tie-in cords by connecting terminal 166 of erase coil 58 in recorder 10 to ground through line 168, line 171, prong 170, sleeve 172, and prong 174. Grounding erase coil 58 also grounds out needed recording bias for one signal which is taken instead from the oscillator on recorder 12. Bias therefore comes from erase coil 60, terminal 158, line 160, line 173, and is sent through capacitor 162, prong 164, to tip 154 carrying the recording signal needing bias. The ground returns for erase coil 58 and erase coil 60 are terminals 96 and 156 respectively.

Prong 122 of jack 52, prong 118 of jack 50, and prong 148 of jack 52, are all interconnected by conductor 120 and must be grounded to shield prong 124 of jack 52 from prong 116 of jack 50 because said prong 116 has recording bias creating a field which would interfere with the play signal on prong 124. The tie-in cord 54 does this by connecting prong 148 to ground prong 146 through sleeve 144.

In order to record stereo, the top channel signal originating from a microphone, phonograph, or tuner, is plugged into record amplifier 36 of recorder 12 automatically disconnecting conductor 130 and 128 from said amplifier 36. At amplifier 36 the input is prepared as a recording signal and routed through line 82', prong 80', prong 78', line 76', conductor 106 to terminal 104 of top tape head 32 where the input signal is recorded. Ground return for the top channel tape head 32 is terminal 100, line 102, prong 66', prong 68', line 70' to ground as shown. The bottom channel signal originating from a microphone, a phonograph, or tuner, is plugged into amplifier 20 of recorder 10, automatically disconnecting conductors 92 and 94 from said amplifier 20. At amplifier 20 the input is prepared as a recording signal and routed through conductor 82, prong 80, tip 150, conductor 152, tip 154, prong 116, conductor 114, to terminal 112 of bottom tape head 30 of recorder 12 where the input signal is recorded. Ground return for bottom channel tape head 30 is terminal 108, and conductor 10 connected to ground as shown.

In order to play stereo, the tape replayed is loaded on recorder 12 and both recorders are switched to "play." The top channel signal is played by top tape head 32 of recorder 12 and is relayed through terminal 104, conductor 106, line 76', prong 78', prong 80', conductor 82' to play amplifier 36, and thence to the speaker for said recorder 12. The bottom channel signal is played by bottom tape head 30 of recorder 12 and is relayed through terminal 112, conductor 114, prong 116, tip 154, conductor 152, tip 150, prong 80, conductor 82, to play amplifier 20 of recorder 10, from whence it is then directed to the speaker connected to recorder 10.

It should be understood that the circuitry of FIG. 2 does not make recorders 10 and 12 inoperative as monophonic units simply because the internal switching of amplifiers 20 and 36 and preamplifiers 18 and 34 is not shown. With nothing plugged into the amplifier input jack the top and bottom heads are connected when a machine is in "record" mode but in this situation neither machine is being used and the closed loop is of no consequence. The only thing a machine can do in "record" mode with no external input is erase. However, in the "record" mode with an external signal plugged into he input jack the connection between the top and bottom heads is broken by the input jack. When machine is in "play" mode the bottom head is not used or connected because switching to "play" disconnects the bottom head and the top head plays to the speaker.

Since each of the monophonic units 10 and 12 are provided with the four jacks 46, 48, 50 and 52, that is, the left-hand side of each recorder has jacks 50 and 52, and the right-hand side of the unit has jacks 46 and 48, stereo can also be played by inserting the tie-in cords in the jacks on the left-hand side only of both recorders. In other words, tie-in cords 54 and 56 would interconnect jacks 50 and 52 of one recorder with jacks 50 and 52 of the other recorder. Either recorder will then play stereo depending upon which play button is depressed. The other recorder is placed in the "monitor" mode and it monitors the lower channel signal. In brief, the bottom channel tape head output on each recorder, represented by jack 50, is routed by the tie-in cords to the low-level input jacks, represented by jack 52 on each recorder. Such input signal is then monitored. Stereo may be played yet another way. Since both recorders have stereo heads and stereo head outputs, represented by jacks 46 and 50, relying on the amplifier-speaker components of an outside high fidelity music system to complete the job.

While the invention has been described and illustrated herein with reference to preferred embodiments thereof, it will be understood by those skilled in the art that various changes in form and detail may be made without departing from the true spirit and scope of the invention.

What is claimed is:

1. In a system for recording and playing back stereophonically and duplicating stereophonic tapes on two separably operable and detachably interconnectable monaural recorder units, in which each unit includes a stereophonic tape head having first and second channel tape heads and an erase coil, and which also includes an amplifier and preamplifier for operation of said second channel tape head, said first channel tape head being connected to said preamplifier and said preamplifier and second channel tape head being connected to said amplifier, the improvements in each unit, comprising:

a. first switch means connected to said second channel tape head and said amplifier and adapted to disconnect said second channel tape head from said amplifier so that said second channel tape head may be connected to the preamplifier of a second identical unit;

b. second switch means connected to said amplifier and said second channel tape head and with said first switch means adapted to disconnect said amplifier from said second channel tape head so that said amplifier may be connected to the first channel tape head of a second identical unit;

c. third switch means connected to said preamplifier and said first channel tape head and adapted to disconnect said preamplifier from said first channel tape head so that said preamplifier may be connected to the second channel tape head of a second identical unit; and d. fourth switch means connected to said first channel tape head and said preamplifier and with said third switch means adapted to disconnect said first channel tape head from said preamplifier so that said first channel tape head may be connected to the amplifier of a second identical unit.

2. The system according to claim 1, and in which said first, second, third, and fourth switch means are jack switches.

* * * * *